United States Patent [19]

Ng et al.

[11] Patent Number: 5,662,081

[45] Date of Patent: Sep. 2, 1997

[54] OIL SUPPLY FAILURE DETECTION CIRCUIT

[75] Inventors: Paul T. Ng, Vernon Hills, Ill.; Michael J. French, Kenosha, Wis.

[73] Assignee: Outboard Marine Corporation, Waukegan, Ill.

[21] Appl. No.: 506,587

[22] Filed: Jul. 24, 1995

[51] Int. Cl.⁶ .................................................. F01M 1/18
[52] U.S. Cl. .................................. 123/196 S; 361/187
[58] Field of Search .......................... 123/196 R, 196 S; 361/154, 187

[56] References Cited

U.S. PATENT DOCUMENTS

| | | | |
|---|---|---|---|
| 4,370,089 | 1/1983 | McClain et al. | 417/18 |
| 4,384,825 | 5/1983 | Thomas et al. | 417/22 |
| 4,444,546 | 4/1984 | Pazemenas | 417/12 |
| 4,520,902 | 6/1985 | Snow | 184/7.4 |
| 4,864,287 | 9/1989 | Kierstead | 340/648 |
| 5,015,151 | 5/1991 | Snyder, Jr. et al. | 417/18 |
| 5,020,362 | 6/1991 | Hart et al. | 73/119 A |
| 5,083,905 | 1/1992 | Mohn | 417/45 |
| 5,293,551 | 3/1994 | Perkins et al. | 361/154 |
| 5,347,419 | 9/1994 | Caron et al. | 361/187 |
| 5,383,086 | 1/1995 | Wietelmann et al. | 361/187 |
| 5,442,515 | 8/1995 | Wallaert | 361/187 |
| 5,450,270 | 9/1995 | Takahashi | 361/154 |
| 5,469,825 | 11/1995 | Golab et al. | 361/154 |
| 5,490,031 | 2/1996 | Braun et al. | 361/154 |

*Primary Examiner*—Erick R. Solis
*Attorney, Agent, or Firm*—Jones, Day, Reavis & Pogue

[57] ABSTRACT

An internal combustion engine assembly including an internal combustion engine, an electronic control unit for generating control signals for controlling the engine and a solenoid oil pump for supplying oil to the engine. The oil pump includes an armature and a solenoid winding encircling the armature and being connected to the electronic control unit so that the electronic control unit causes movement of the armature and so as to allow the electronic control unit to detect the flow of current in the solenoid winding.

4 Claims, 3 Drawing Sheets

5,662,081

1

OIL SUPPLY FAILURE DETECTION CIRCUIT

BACKGROUND OF THE INVENTION

The invention relates to internal combustion engines and particularly to a system for supplying oil to the crankcase of an internal combustion engine.

Known internal combustion engines utilize some form of an oil pump for supplying oil to the crankcase and cylinders of the engine. If a steady flow of oil is not supplied to the moving parts in the engine, severe and possibly permanent damage may result. Commonly known oil pumps employ some form of a solenoid that includes an inductive solenoid winding and an armature moveable within the winding in response to current flow through the winding. If the armature becomes lodged or stuck in a particular position (as sometimes happens with mechanical devices), then the supply of oil to the engine may cease.

SUMMARY OF THE INVENTION

Accordingly, the invention provides an internal combustion engine and an oil supply failure detection circuit for determining whether the supply of oil to the internal combustion engine has been interrupted. The engine includes a solenoid oil pump for supplying oil to the engine. The oil pump has an armature and a solenoid winding encircling the armature so that, as current flows through the solenoid winding, the magnetic field generated by the current causes longitudinal movement of the armature in response to the current.

The engine also includes an electronic control unit ("ECU") for generating control signals that selectively cause the current to flow through the solenoid winding. The ECU includes means for detecting movement of the armature. In one form, the means for detecting movement of the armature is a current measuring device connected to the solenoid winding to determine the amount of current flowing through the winding. The ECU monitors the measured current and compares the measured current with a current flow profile stored in the ECU memory. Based upon this comparison, the ECU determines whether or not the solenoid pump is operating normally.

If the armature is stuck, so that the pump is not operating properly, the ECU can attempt to free the armature, so that the pump operates properly, either by increasing the voltage applied to the solenoid or by increasing the frequency with which the solenoid is energized.

More particularly, the invention provides apparatus comprising: a solenoid including an armature and a solenoid winding encircling the armature for causing movement of the armature in response to current flow through the solenoid winding; and an electronic control unit including a sensor for detecting the movement of the armature.

The invention also provides apparatus comprising: an electronic control unit for generating control signals; and a solenoid including an armature and a solenoid winding encircling the armature and being connected to the electronic control unit so that the electronic control unit causes movement of the armature and so as to allow the electronic control unit to detect movement of the armature.

The invention also provides an engine assembly comprising an internal combustion engine, an electronic control unit for generating control signals for controlling the engine and including a sensing resistor, a controller having an analog to digital converter connected to the sensing resistor and having an output port, and a transistor having a base connected to the output port, an emitter connected to the sensing resistor and a collector, a solenoid oil pump for supplying oil to the engine and including an armature, and a solenoid winding encircling the armature and being connected to the collector so that the electronic control unit causes current flow in the solenoid winding to move the armature and so that the electronic control unit detects the flow of current in the solenoid winding in order to determine whether the armature is in a stuck condition, and freeing means for freeing the armature from the stuck condition.

Other features and advantages of the invention are set forth in the following detailed description and claims.

Figure 1:
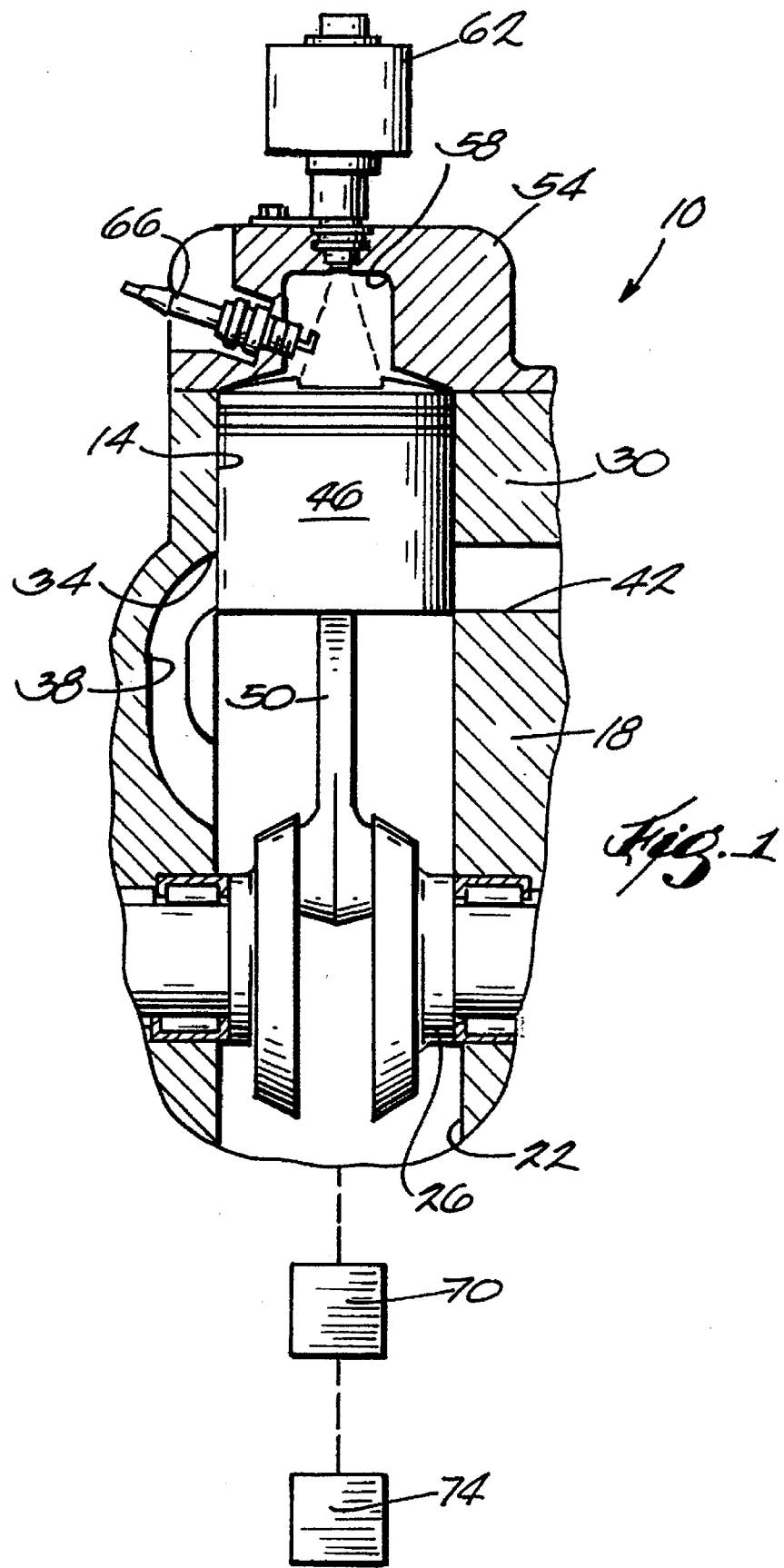
FIG. 1 is a side elevation view of an internal combustion engine embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF THE PREFERRED EMBODIMENT

Partially shown in FIG. 1 of the drawings is an internal combustion engine 10. One cylinder 14 of the engine 10 is illustrated in FIG. 1. The engine 10 includes a crankcase 18 defining a crankcase chamber 22 and having a crankshaft 26 rotatable therein. An engine block 30 defines the cylinder 14. The engine block 30 also defines an intake port 34 communicating between the cylinder 14 and the crankcase chamber 22 via a transfer passage 38. The engine block 30 also defines an exhaust port 42. A piston 46 is reciprocally moveable in the cylinder 14 and is drivingly connected to the crankshaft 26 by a crank pin 50. A cylinder head 54 closes the upper end of the cylinder 14 so as to define a combustion chamber 58. The engine 10 also includes a fuel injector 62 mounted on the cylinder head 54 for injecting fuel into the combustion chamber 58. A spark plug 66 is mounted on the cylinder head 54 and extends into the combustion chamber 58.

Figure 2:
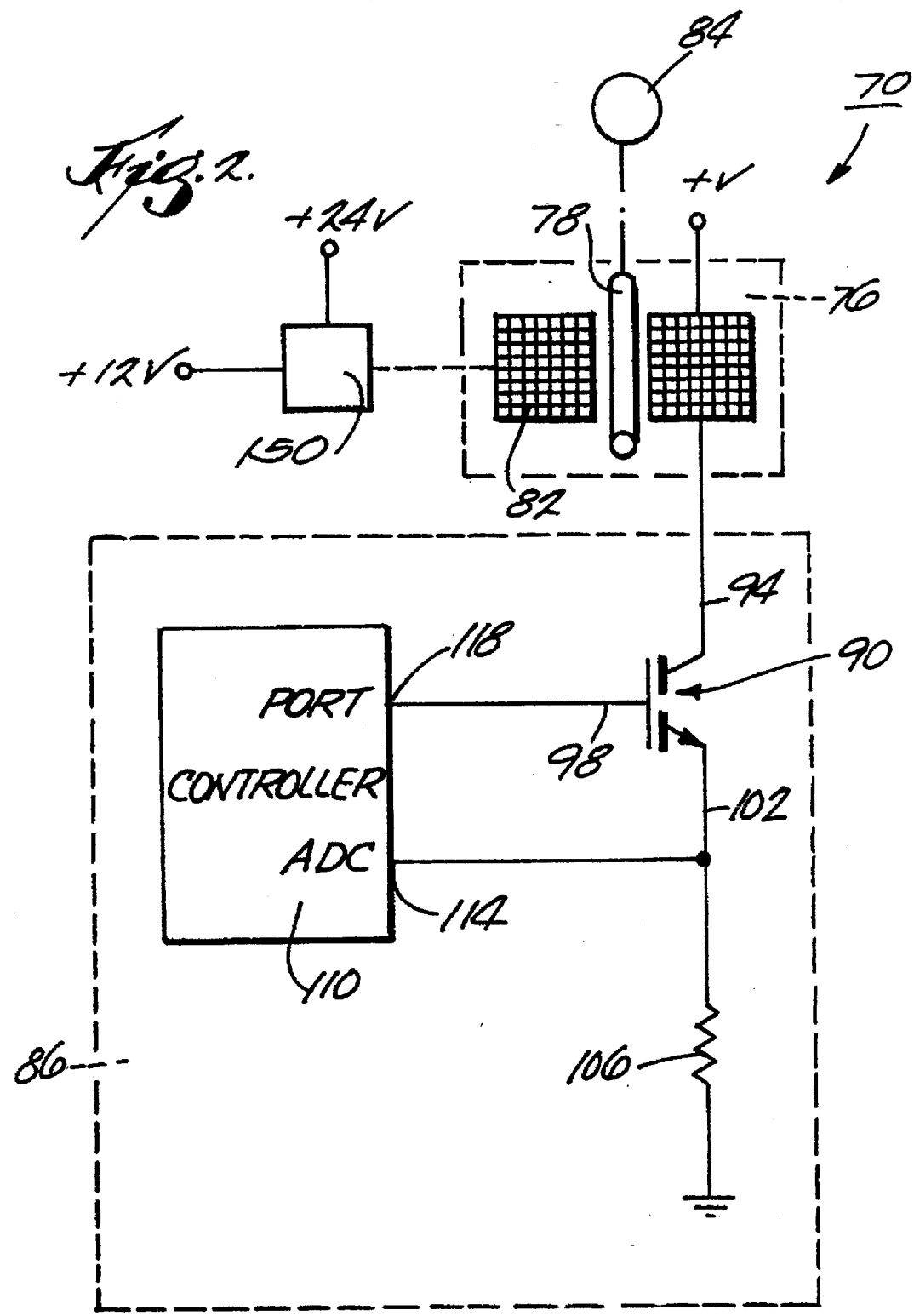
FIG. 2 is a schematic illustration of the fuel pump and the oil supply failure detection circuit of the internal combustion engine.

The engine 10 also includes an oil pump 70 (shown schematically in FIGS. 1 and 2) and an oil reservoir 74 (FIG. 1 only) connected to the oil pump 70. The oil pump 70 draws oil from the oil reservoir 74 and pumps the oil into the crankcase chamber 22 to lubricate the moving parts of the engine 10. As shown in FIG. 2, the oil pump 70 is connected to a source of electrical current (+V) and includes a housing 76, a ferromagnetic armature 78, and a solenoid winding 82 which is supported by the housing 76 and which encircles the armature 78 so that flow of electrical current through the solenoid winding 82 causes movement of the armature 78 to pump oil from the oil reservoir 74 to the crankcase chamber 22. Because the armature 78 is ferromagnetic, the position of the armature 78 relative to the solenoid winding 82 affects the inductance of the solenoid winding 82 and the flow of current therethrough. Movement of the armature 78 causes movement of a valve member 84 (shown schematically in FIG. 2) which corresponds to the valve member 251 of the application identified below.

While the invention is applicable to any oil pump, the preferred oil pump is shown and described in the co-pending U.S. patent application Ser. No. 08/507,051, which is titled "OIL LUBRICATING SYSTEM FOR A TWO-STROKE INTERNAL COMBUSTION ENGINE", which is filed on even date herewith and which is incorporated herein by reference.

Referring to FIG. 2, the internal combustion engine 10 also includes an ECU 86 for controlling the operation of the engine 10. The ECU 86 includes a transistor 90 which operates in the active region to control the flow of current through the solenoid winding 82. The transistor 90 includes a collector 94 connected to the solenoid winding 82, a base 98 and an emitter 102. The ECU 86 also includes a sensing resistor 106 connected between the emitter 102 and a ground or reference point. The ECU 86 also includes a controller 110 having an analog to digital converter ("ADC") 114 connected to the emitter 102 of the transistor 90. The controller 110 also includes an output port 118 connected to the base 98 of transistor 90.

Figure 3:
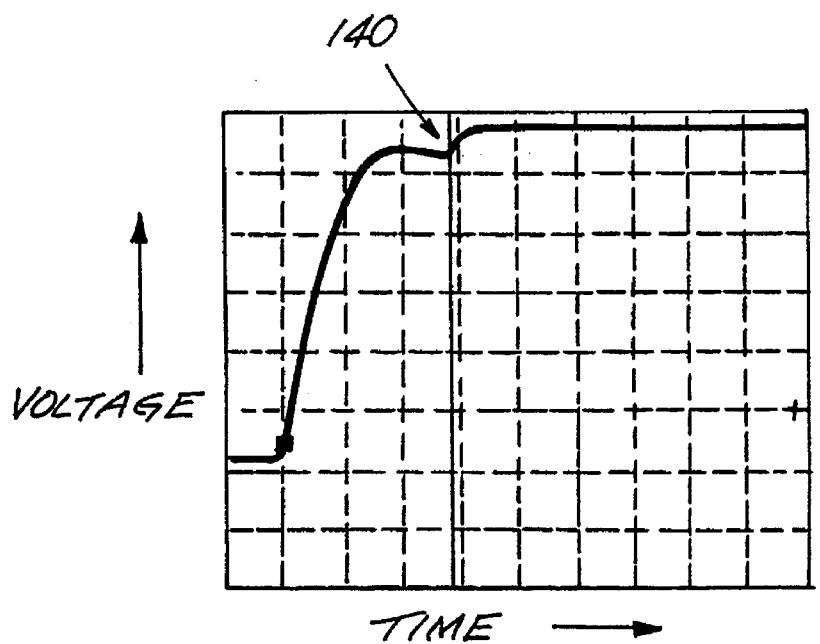
FIG. 3 is a graph of the solenoid pump current waveform under normal operating conditions.

In normal operation, current flowing through the solenoid winding 82 and transistor 90 causes movement of the armature 78 of the oil pump 70. Movement of the armature 78 results in a continuous change in the inductance of the winding and a corresponding smooth exponential increase in the flow of current through the winding 82. As current flows through the winding 82, a voltage develops across sensing resistor 106. FIG. 3 illustrates the current waveform for normal operation of the oil pump 70. The voltage on the sensing resistor 106 is input to the ADC 114 of the controller 110. When the armature 78 reaches the end of the pump stroke, the inductance of solenoid winding 82 quickly ceases to change resulting in a small step or jump in the current waveform. This step is identified by reference numeral 140 in FIG. 3.

Figure 4:
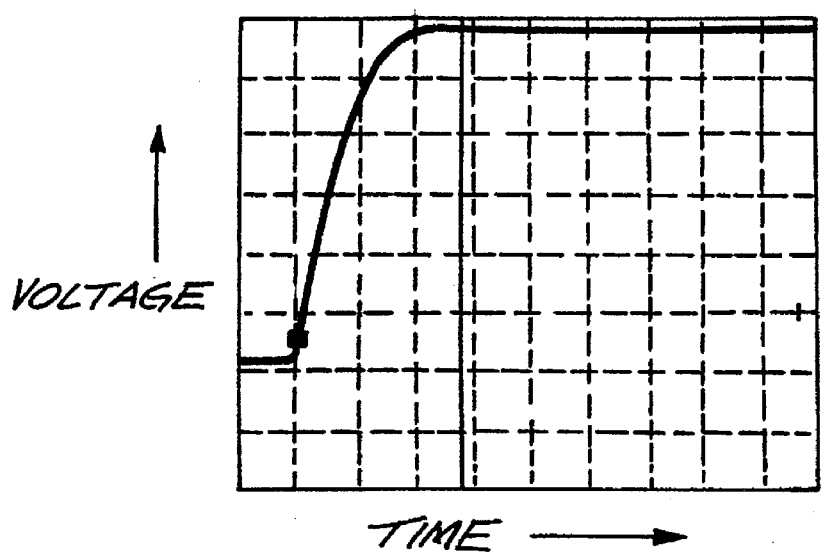
FIG. 4 is a graph of the solenoid current waveform when the solenoid armature is stuck.

FIG. 4 illustrates waveform indicative of the solenoid winding current for an oil pump with an armature that is stuck. If the solenoid armature 78 is stuck, then the inductance of the winding 82 does not change and the current rises exponentially in the winding 82. Because the inductance is constant and the armature is fixed, there is no change to detect in the rate of change of the inductance in the winding 82 and no resulting step in the waveform indicating the solenoid winding current. By measuring the voltage on the sensing resistor 106 at two (at least) different periods in time, the controller 110 can determine whether or not there is a step in the solenoid current waveform and thereby detect whether the oil pump is operating normally. This is achieved using a software based program that scans the voltage on the sensing resistor 106 at predetermined intervals. If the step 140 is detected, then the solenoid is operating normally and no action is necessary except to reset the circuit for the next pumping stroke. If the step is not detected, then a counter (not shown) is incremented. The counter may be connected to an indicator to provide an signal to the operator of the boat that a problem exists with the oil pump.

In other words, the ECU 86 utilizes a current feedback loop to monitor the magnitude of the current flowing in the solenoid winding 82 and determine, based on the magnitude of the current flow through the solenoid winding 82, whether or not the oil pump 70 is operating correctly. In other embodiments (not shown), other circuit parameters may be used such as current slope, change in inductance, etc.

The engine 10 preferably further comprises means for freeing the armature 78 when the armature is stuck. Various suitable means can be employed. In the preferred embodiment, the ECU 86 can either: (1) increase the frequency of the signal with which the transistor 90 is biased to cause current flow through the winding 82; or (2) increase the voltage (normally 12 volts) applied to the winding 82. Preferably, the engine 10 includes a dual voltage alternator such as that disclosed in co-pending U.S. patent application Ser. No. 08/507,028, which is titled "DUAL VOLTAGE REGULATED SUPPLY CIRCUIT FOR A MARINE PROPULSION DEVICE", which is filed on even date herewith and which is incorporated herein by reference. The engine 10 accordingly has a 12-volt output and a 24-volt output (see FIG. 2). As shown in FIG. 2, the ECU 86 includes a switch 150 operated to connect the solenoid winding 82 to either the 12-volt output or the 24-volt output. Additionally, the ECU 86 could increase the frequency of energization and increase the voltage at the same time.

Various features and advantages of the invention are set forth in the following claims.

We claim:

1. An engine assembly comprising an internal combustion engine, an electronic control unit for generating control signals for controlling said engine and including a sensing resistor, a controller having an analog to digital converter connected to said sensing resistor and having an output port, and a transistor having a base connected to said output port, an emitter connected to said sensing resistor and a collector, a solenoid oil pump for supplying oil to said engine and including an armature, and a solenoid winding encircling said armature and being connected to said collector so that said electronic control unit causes current flow in said solenoid winding to move said armature and so that said electronic control unit detects the flow of current in said solenoid winding in order to determine whether said armature is in a stuck condition, and freeing means for freeing said armature from said stuck condition.

2. An engine assembly as set forth in claim 1 wherein said freeing means includes means for increasing the voltage applied to said winding.

3. An engine assembly as set forth in claim 1 wherein said freeing means includes means for increasing the frequency with which said electronic control unit causes current flow through said winding.

4. An engine assembly as set forth in claim 1, wherein said oil pump also includes a housing supporting said solenoid winding, and a pumping member movable relative to said housing in response to movement of said armature, such that said electronic control unit detects movement of said member by detecting the flow of current in said solenoid winding.

\* \* \* \* \*